United States Patent [19]
Bond

[11] Patent Number: 5,685,085
[45] Date of Patent: Nov. 11, 1997

[54] DIAMETER-MEASURING GAUGE

[76] Inventor: Jerry L. Bond, 1020 120th Ave. SE., Clara City, Minn. 56222

[21] Appl. No.: 612,120

[22] Filed: Mar. 7, 1996

[51] Int. Cl.$^6$ .................. G01B 3/38; G01B 5/08
[52] U.S. Cl. .................. 33/555.3; 33/520; 33/562
[58] Field of Search .................. 33/520, 501.05, 33/562, 555.2, 555.3

[56] References Cited

U.S. PATENT DOCUMENTS

| | | | |
|---|---|---|---|
| 741,146 | 10/1903 | Labofish | 33/562 |
| 1,275,802 | 8/1918 | Wallace | 33/520 |
| 1,377,288 | 5/1921 | Williams | 33/562 |
| 1,389,486 | 8/1921 | Brewer | 33/562 |
| 1,493,465 | 5/1924 | Burden | 33/520 |
| 1,553,961 | 9/1925 | Pryce . | |
| 2,463,127 | 3/1949 | Tallaksen et al. . | |
| 2,678,498 | 5/1954 | Rimmel . | |
| 2,896,333 | 7/1959 | Kivela . | |
| 4,356,636 | 11/1982 | Roberts . | |
| 4,567,670 | 2/1986 | Rouistone . | |

FOREIGN PATENT DOCUMENTS 650588  2/1951  United Kingdom ........ 33/501.05

*Primary Examiner*—Thomas B. Will
*Attorney, Agent, or Firm*—Schroeder & Siegfried, P.A.

[57] ABSTRACT

A diameter-measuring gauge for measuring the diameter of rods, pipe and the like comprised of a thin panel having a V-shaped recess formed in one of its side edges. The recess extends through the panel which carries a plurality of oppositely disposed shoulders along opposite recess-defining portions of the panel, the distance between said opposed shoulders being one of the standard diameters of rods, pipe, or the like. The distance between the shoulders of each pair is less than the distance between the shoulders of the adjacent outwardly disposed pair. Suitable indicia is carried at the surface of the panel to appropriately indicate the diameter of a rod or the like, which bears against the adjacent pair of shoulders. The gauge is simple, easy to use, and highly practical. In addition, it is inexpensive to manufacture and, as a consequence, is readily adaptable for use as a give-away advertising item, as well as a standard item in a worker's tool box.

5 Claims, 2 Drawing Sheets

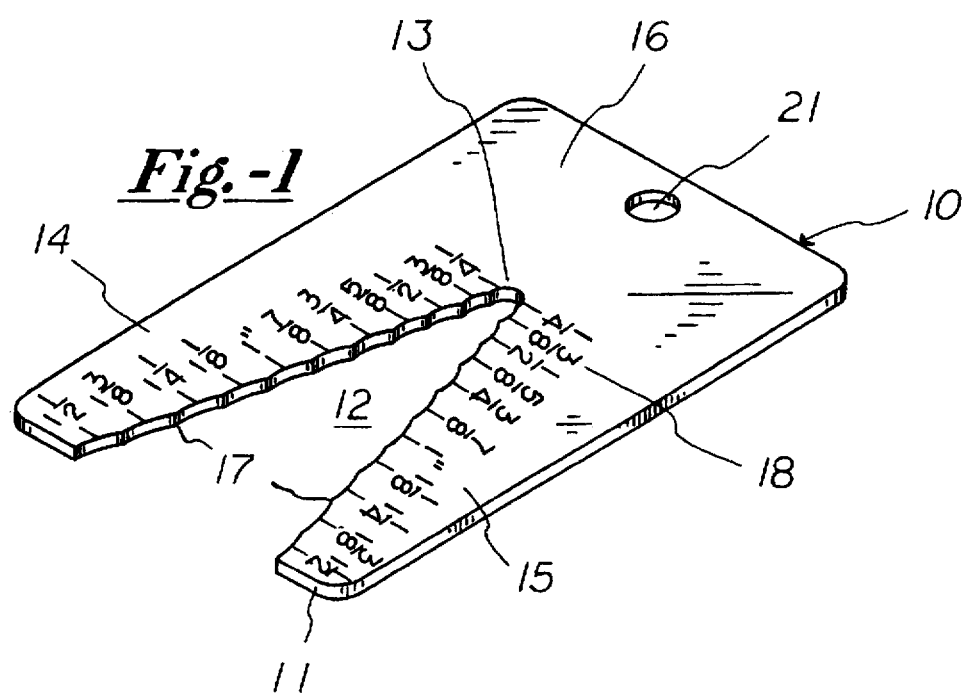
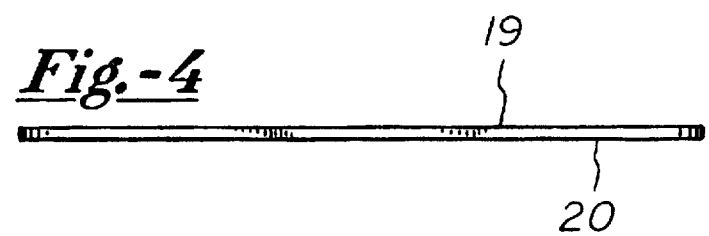
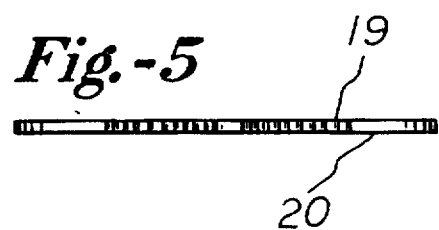
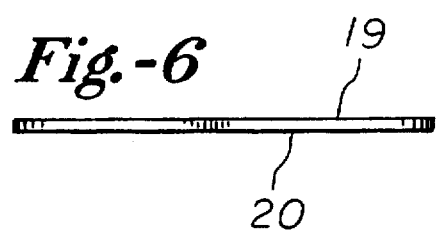

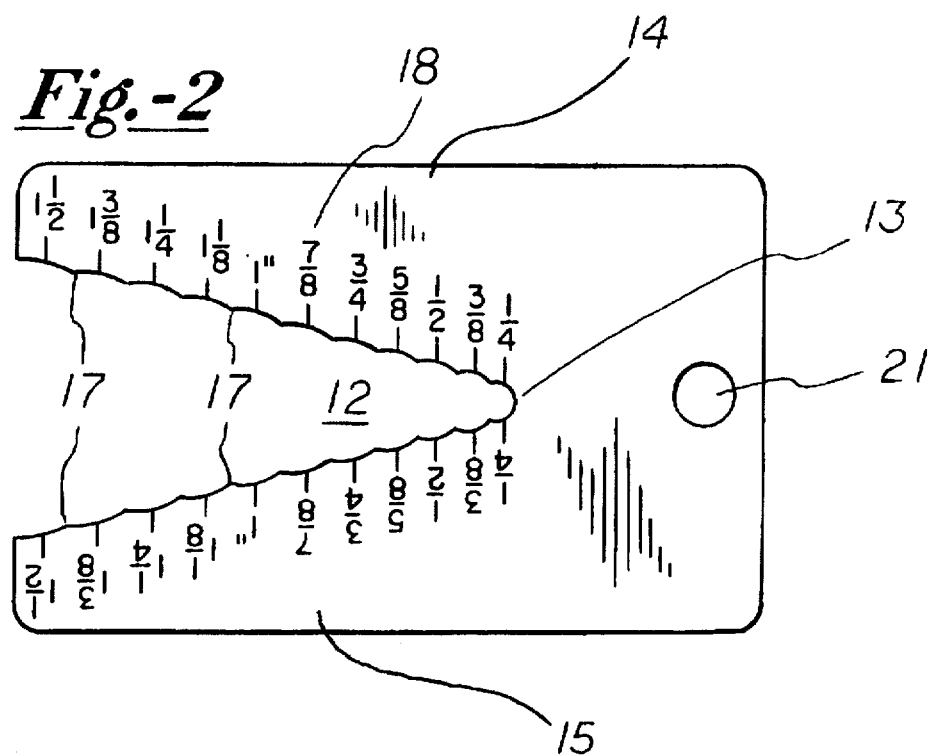
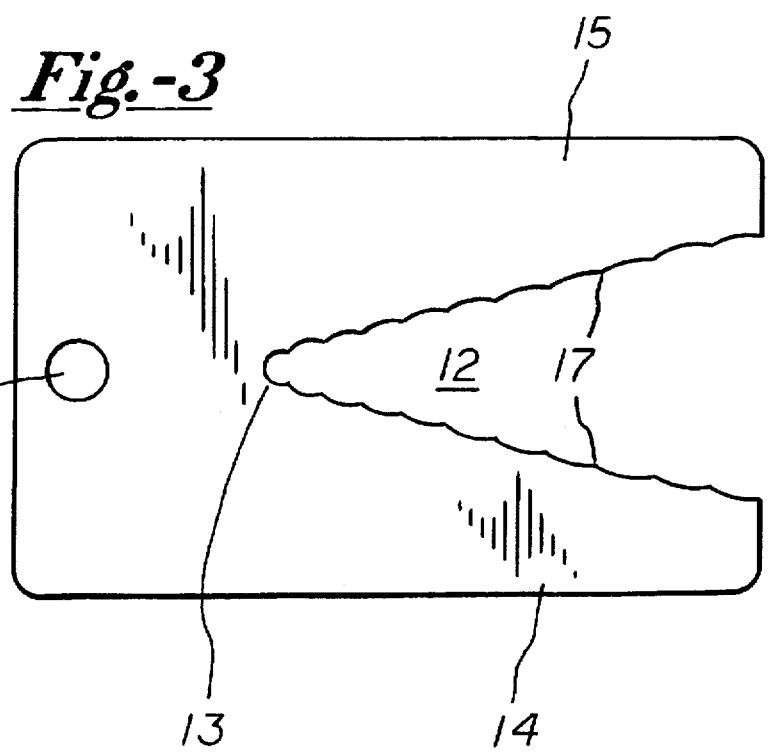

DIAMETER-MEASURING GAUGE

I. DESCRIPTION

BACKGROUND OF THE INVENTION

This invention relates to gauges and, more particularly, to gauges which are useful in connection with the sizing or gauging of a plurality of items. It is particularly suitable for use in the field where there is a need for a go-no go gauge, which can be carried in the pocket and is, therefore, always available for ready use.

A need exists for such an item, which should be constructed so as to be easily utilized and always readily available. Household repairmen and other workers have need for a convenient gauge so that they may be able to obtain replacements or provide items such as nuts which are utilized in conjunction with threaded rods, of the proper size. This gauge is also suited for professional use and will be welcomed in the tool box of the plumber, carpenter, layman, etc., as well as by the householder.

There has been a variety of prior gauges directed toward filling the above needs. All of them, however, within my knowledge, are relatively bulky, complex, and therefore difficult to utilize and store. The closest prior art of which I have knowledge is U.S. Pat. No. 2,896,333, issued to Stanley E. Kivela on Jul. 28, 1959. That patent shows a flat sheet of material and a plurality of various slots and recesses which extend at right angles to the plane of the sheet to provide a variety of measuring elements. The portion thereof which is designed to measure rods, shafts, etc., is best shown in FIG. 4. As will be readily appreciated, the only way it can be utilized for that purpose is by inserting the rod or shaft in the interior of the sheet, and the only way of knowing the diameter of the rod or shaft would be for the user to have memorized the various levels to which the rod or shaft may penetrate into the sheet. This is true, because there is no way to apply suitable indicia of the diameter of the various levels. It will be noted that the recess 46 does not extend through the body of the gauge 10.

It will also be noted that, in the use of the gauge shown in the Kivela patent, supra, it will be difficult to avoid the introduction of errors, because the rod to be measured must be held truly at right angles to the outer surface of the gauge. My invention obviates the problems experienced, as described above.

BRIEF SUMMARY OF THE INVENTION

My new invention is extremely simple, easy to use, and inexpensive to manufacture. It is comprised of a panel having a pair of opposite surfaces and at least one outer edge into which a generally V-shaped recess is formed. The portions of the plate or panel which define the V-shaped opening is characterized by a plurality of pairs of oppositely disposed shoulders, which are spaced transversely of the recess a distance equal to the desired measurements. Thus, such opposed pairs will be located so that the distance therebetween is one-fourth, three-eighths, one-half, etc., of an inch. A separate plate is provided for measuring sixteenths of an inch, because of the difficulty of being able to apply indicia of suitable size and readability, without confusion. Also, if the pairs of shoulders are positioned within one-sixteenth of an inch of each other, it is difficult to avoid the introduction of error in the manufacture and in the use of the gauge.

My gauge is of such a size that it can be readily carried in the pocket and, thus, is always readily available for use in obtaining a go-no go decision with respect to the diameter of a given rod, shaft, pipe, etc. As will be readily seen, the diameter of such an item is readily determinable by merely moving the end of the item into the recess as far as it will extend and until it engages a pair of opposed shoulders. When this takes place, the diameter of the item to be measured can be readily seen on the surface of the gauge.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which:

FIG. 1 is a perspective view from above of one of my new gauges;

FIG. 2 is a top plan view of the same;

FIG. 3 is bottom plan view of the panel which comprises the gauge;

FIG. 4 is a side elevational view of the gauge;

FIG. 5 is an end elevational view of the gauge shown in FIG. 2, as viewed from the left; and FIG. 6 is an end elevational view of the panel shown in FIG. 2, as viewed from the right.

DETAILED DESCRIPTION OF THE INVENTION

The preferred embodiment of my invention is shown in FIGS. 1–6, inclusive. As shown, it includes a panel 10 which is flat and thin, and is generally rectangular in shape. As such, it has a plurality of outer edges, such as 11, in one of which a generally V-shaped recess 12 is formed. As shown, the recess has an inner end 13. The portions 14 and 15 of the panel 10, which define the opening 12, are in the form of legs which extend outwardly from the main body portion 16 of the panel. At the opening defining portions, the surfaces of the legs which define the opening 12 are characterized by plurality of oppositely disposed shoulders 17. The diametrical distance between each pair of shoulders is accurately defined in the construction of the opening, and appropriate indicia 18 is carried by the upper surface of the panel adjacent each opposed shoulder 17.

The panel 10 is flat and thin, being approximately one-eighth inch thick. As a consequence, it can be stamped, rather than machined, even though made of metal. I have found that, for household use, the most widely accepted material from which the gauge should be made is plastic, whereas hardware stores and professionals prefer panels made of metal, such as stainless steel and which have been machined.

It will be noted that the diameter-measuring surfaces of my gauge are formed in the edge of the panel 10, rather than the side surface, and the V-shaped opening extends entirely through the panel 10, instead of part way. Also, it extends lengthwise of the plane of the panel, rather than transversely thereto. The indicia 18 are etched or otherwise applied to the side of the panel. For example, when the panel is made of plastic, it can be merely stamped, and when it is made of a metal such as stainless steel, the desired diameters can be etched on either or both of the two surfaces, 19 and 20.

As indicated above, we have found it is preferable to provide separate gauges for one-sixteenth and one-eighth inch measurements. Thus, each of the indicia are spaced one-eighth of an inch, thereby providing ample room for displaying the various measurements without confusion. If desired, two such gauges can be secured and carried together by inserting a fastener in the openings 21, which is disposed at the inner end of the panel, as shown.

It will be seen that the diameter of a rod or shaft can be readily seen merely by inserting the end of the rod into the recess 12, while extending transversely thereof. As the rod reaches the shoulder which bears the indicia which accurately indicates the correct diameter of the rod, the circumferential surface of the rod engages the concave surfaces located immediately outwardly of such indicia, in complementary fashion. Alternatively, the diameter of the rod can be determined by applying the gauge to the end of the rod while in the same plane, until the end thereof abuts against one of the pairs of opposite shoulders carried by the gauge. The diameter of the rod can be readily viewed, when this has been accomplished, by merely reading the indicia disposed adjacent the shoulders abutting against the end of the rod.

I have found that the gauge shown in FIGS. 1–6 is an ideal tool for field checking dimensions of various rods, shafts, pipes, etc., in the field. I have also found that this gauge is more accurate than a caliper in the hands of a layman, so that any person capable of reading the indicia can readily, quickly and accurately determine the diameter of such an item, by merely applying the legs of the gauge, as described hereinabove, to such an item.

I have found that a set of two such gauges will check the most common rod or shaft sizes found in small machine shops. Of course, for special types of needs, the panel and the opening therein can be made of substantially larger sizes to accommodate such unusual needs.

It will, of course, be understood that various changes may be made in the form, details, arrangement and proportions of the parts without departing from the scope of the invention which comprises the matter shown and described herein and set forth in the appended claims.

I claim:

1. A diameter-measuring gauge for measuring the diameter of rods, shafts or pipe, comprising:

(a) a panel having a main body portion and a pair of adjacent, spaced, generally parallel legs extending outwardly therefrom;

(b) each of said legs having opposite and adjacent inner leg surfaces cooperatively defining a generally V-shaped recess therebetween;

(c) said inner leg surfaces carrying a plurality of adjacent pairs of opposite shoulders, the shoulders of each pair being disposed at opposite sides of said recess;

(d) said adjacent pairs of shoulders being disposed at various intervals along said inner leg surfaces;

(e) the transverse distance between each pair of said shoulders being less than that of the adjacent pair of shoulders disposed outwardly thereof;

(f) appropriate indicia applied to said legs, adjacent said pairs of shoulders, to indicate the diameter of the smallest rod which will not pass inwardly therebetween; and (g) the portions of said inner leg surfaces extending between said adjacent pairs of opposite shoulders and said indicia being concaved throughout and bearing against the circumferential surface of a rod, which has its diameter indicated by the indicia, when the rod is being measured.

2. The diameter-measuring gauge defined in claim 1, wherein said panel is flat, thin and made of plastic.

3. The diameter-measuring gauge defined in claim 1, wherein said panel is thin and made of metal.

4. The diameter-measuring gauge defined in claim 1, wherein said panel is generally rectangular in shape and said recess extends in the general direction of the longest dimension of said panel.

5. The diameter-measuring gauge defined in claim 1, wherein said panel is generally rectangular in shape and said shoulders of said pairs are equidistant from the longitudinal center-line of said panel.

* * * * *